United States Patent [19]

Pedersen

[11] 4,169,977
[45] Oct. 2, 1979

[54] APPARATUS FOR THE APPLICATION, POSITIONING AND ADJUSTMENT OF SECTIONS IN THE ASSEMBLY OF PANELS

[75] Inventor: Einar Pedersen, Ø. Varåsen 7, 5200 Os, Norway

[73] Assignee: Einar Pedersen, Os, Norway

[21] Appl. No.: 850,265

[22] Filed: Nov. 10, 1977

[30] Foreign Application Priority Data

Nov. 11, 1976 [NO] Norway ............................. 763844
Oct. 11, 1977 [NO] Norway ............................. 773471

[51] Int. Cl.² ................................................ B23K 9/12
[52] U.S. Cl. ................................. 219/125.1; 212/13; 219/137.41; 228/44.1 R; 228/49 R
[58] Field of Search ................. 228/47, 49 R, 44.1 R; 219/137.41, 125.1, 158, 161, 124.1, 124.21, 124.22; 212/11, 13

[56] References Cited

U.S. PATENT DOCUMENTS

| 1,640,437 | 8/1927 | Chapman | 219/158 |
| 1,910,259 | 5/1933 | Raymond | 219/125.1 |
| 2,204,207 | 6/1940 | Coburn | 212/11 |
| 3,702,914 | 11/1972 | Noura | 219/125.1 |
| 3,712,529 | 1/1973 | Ozawa et al. | 228/44.1 |

Primary Examiner—Lawrence J. Oresky
Attorney, Agent, or Firm—Darby & Darby

[57] ABSTRACT

Apparatus for the application, positioning and adjustment of sections in the assembly of panels or the like, comprising a horizontally movable, gantry like lifting device adapted to transfer the sections from a store to that place on the panel plate to which the individual sections are to be welded. A vertically movable yoke, attached to the supporting uprights of the gantry, extends substantially parallel with the girder of the gantry. A jig displaceable along the yoke comprises lifting magnets for retaining the panel plate and a jack device for pressing the section against the panel plate.

11 Claims, 2 Drawing Figures

APPARATUS FOR THE APPLICATION, POSITIONING AND ADJUSTMENT OF SECTIONS IN THE ASSEMBLY OF PANELS

The invention relates to an apparatus for the application, positioning and adjustment of sections in the assembly of panels or the like, comprising a horizontally movable, gantry-like lifting device adapted to transfer the sections from a store to that place on the panel plate to which the individual sections are to be welded, the gantry comprising a vertically movable yoke which extends substantially parallel with the girder of the gantry and has a number of gripper magnets for the sections. The apparatus can mainly be used in shipyards, but also in mechanical engineering industry in which a relatively large number of plates having sectional reinforcements (so-called panels) are produced.

It is known to use gantry cranes or the like to transfer sections from a store to that place on the horizontally-lying panel plate to which the sections are to be welded. However, the final adjustment and retention of the sections must be performed manually, an operation calling for a large amount of labour and time. Moreover, the work is not completely safe.

The aforementioned procedure is less suitable when the panel plate shows unevennesses, since in such cases it is very difficult to produce the pressure required to bring the plate and section into intimate contact with one another at the place where they are to be welded together.

An attempt has been made to solve this last-mentioned problem by a system comprising a fixed gantry, through which the panel plates are passed to have the sections welded on. The individual sections are introduced laterally under the gantry and retained there, the panel plates being pressed upwards against the section by means of subjacent hydraulic jacks. The gantry therefore acts as an abutment for the jacks, whose total force is transmitted to the gantry. For this reason the gantry must be very solidly and rigidly constructed, and this also requires very strong, suitable foundations. Similarly, expensive equipment is required for moving the panel plate under the gantry, since the correct placing of the sections depends on the accurate positioning of the panel plate for welding.

It is therefore an object of the invention to provide an apparatus of the kind specified which enables the sections to be accurately positioned and adjusted with the minimum labour and without the need for heavy, rigid constructions having correspondingly cumbrous foundations. This object is achieved according to the invention by means of an apparatus as set forth in the claims.

For its clearer understanding, the invention will now be described in greater detail with reference to the embodiment illustrated in the drawings.

Figure 1:
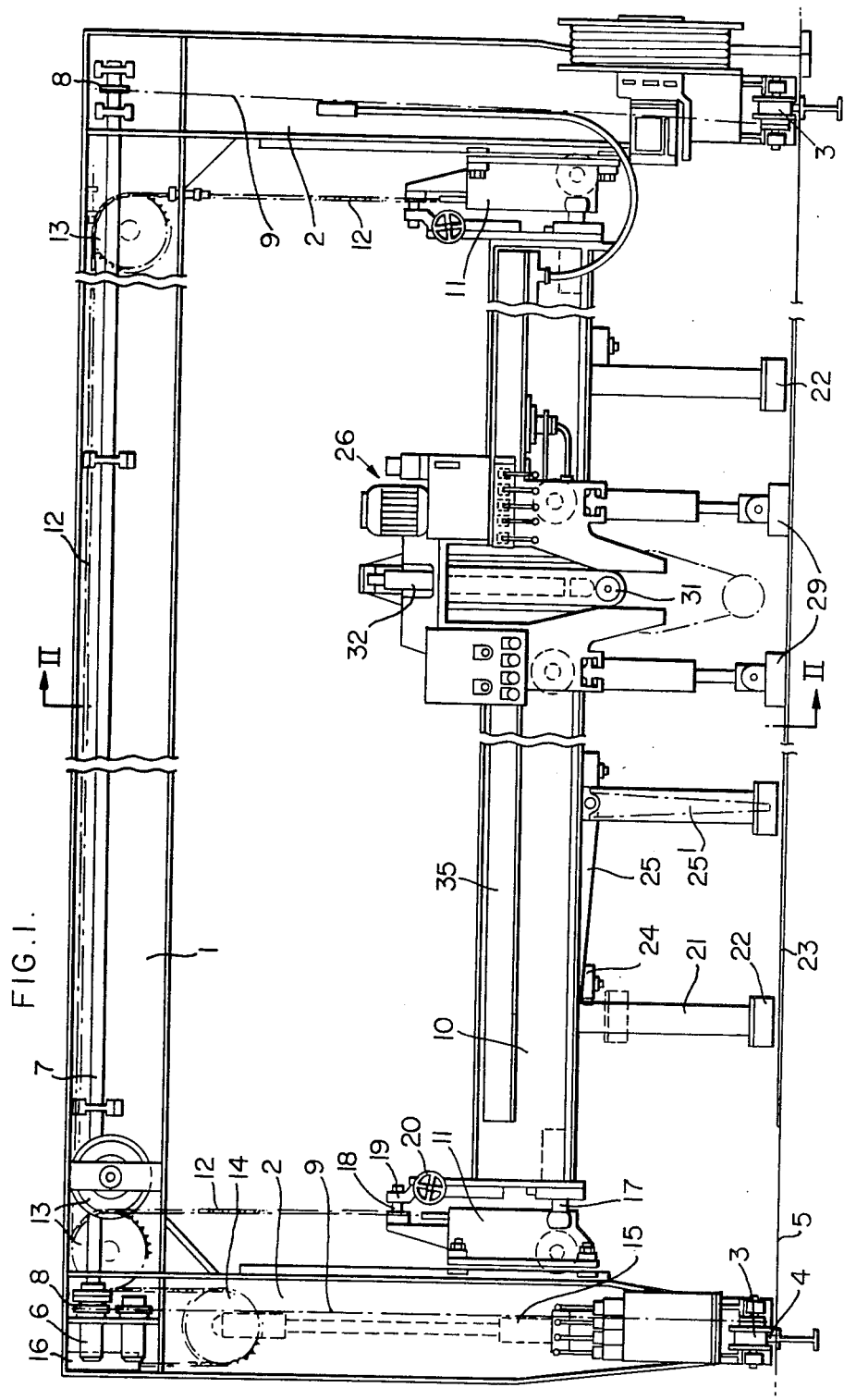
FIG. 1 is a front elevation of an apparatus according to the invention.

FIG. 1 shows a gantry comprising a substantially horizontal girder 1 attached to two supporting uprights 2 having at their bases wheels 3 running on rails 4 or the like in a workshop floor 5.

The gantry can be horizontally reciprocated on the rails by a motor 6 driving a shaft 7 to which a sprocket wheel 8 is attached over which chains 9 run which transmit motive power to the wheels 3.

Disposed between the supporting uprights 2 of the gantry is a yoke 10 extending substantially parallel with the gantry girder 1. The yoke is connected to the supporting uprights by means of guide shoes 11 moved vertically along the supporting uprights by wires 12. The wires 12 run over three fixed pulleys 13 and one movable pulley 14, which is rotatably attached to a hydraulic lifting cylinder 15. One end of one of the wires 12 is attached to a hydraulic adjusting cylinder 16. The yoke 10 is connected to each of the guide shoes 11 at a top and bottom point. The bottom connecting point is formed by a journal 17 which is mounted to pivot around a horizontal axis in the yoke and is secured in the guide shoe after the fashion of a ball-and-socket joint. The top connecting point is formed by a control pin 18 which extends horizontally outwards from the guide shoe in the direction of the yoke and through a corresponding hole in a plate 19 attached to the yoke. Plate 19 can be moved in relation to the yoke and transversely of its longitudinal direction by means of a wheel 20 acting on an adjustment mechanism suitable for this purpose. By turning the wheels 20, therefore, the yoke can be rotated around a substantially horizontal axis through the journals 17.

Since the journal is borne ball-and-socket fashion in the slide shoe and the control pin 18 can move in the plate 19, one guide shoe is enabled to make a certain vertical movement in relation to the other guide shoe. Such relative vertical movement can be produced by means of a hydraulic adjusting cylinder 16.

The bearing of the journal 17 in the yoke 10 is formed by a hydraulic cylinder in which the journal forms the plunger rod. By means of the hydraulic cylinder the journal can be displaced to a certain extent in the longitudinal direction of the yoke and thereby cause a corresponding displacement of the yoke 10 in relation to the gantry. A displacement of this kind is used when finely adjusting the section to the panel plate.

Disposed on the underside of the yoke are a number of magnet holders 21 bearing gripper magnets 22, the purpose of which is to retain the section (not shown) to be welded to a panel plate 23. The electric power to each gripper magnet 22, which is also a solenoid, can be cut off by means of individual circuit breakers 24 if this should be desirable to facilitate the fitting together of the section and panel plate or to prevent the magnetic field of the gripper magnet from affecting welding in its immediate vicinity.

The underside of the yoke 10 also has lowerable sectional supporting legs 25 which, when in the lower position 25', prevent the overturning of a section retained by the lifting magnets, with consequent risk of damage to material and persons, if the powers supply to the gripper magnets should fail.

A jig 26 is movably disposed on the yoke. As seen most clearly in FIG. 2, the jig has wheels 27 which run on rails 28 attached to the lower edge of the yoke.

The cross-sectional shape of the jig is substantially an inverted U, the arms of which extend down on each side of the yoke.

The jig has lifting magnets 29 which are each pivotably attached to a vertically movable hydraulic cylinder 30 and are adapted to lift the panel plate 23 up to the yoke.

The jig also has a pressing roller which can be vertically displaced by a jack 32 in the form of a hydraulic cylinder. The top position of the pressing roller is shown by a solid line, its bottom position being shown by a chain-and-dot line. The function of the pressing roller is to press a section downwards against the panel plate 23 retained by the lifting magnet 29 if the section and panel plate do not automatically become laid against one another with the necessary precision when the section is lowered on to the panel plate by means of the yoke 10.

Since both the lifting magnets and the pressing roller are supported by the jig 26, the necessary pressing forces between the section and panel plates are absorbed in the jig. This has the great advantage that the rest of the construction according to the invention—i.e., the yoke and gantry—can be of a relatively light weight, thus eliminating bulky dimensions and expensive foundations.

The jig according to the invention also has a welding device 33 for tack welding of the section to the panel plate while they are retained in the compressed position of the jig. The jig also has its own hydraulic systems 34 to which electric power is supplied via an encapsulated conductor rail 35 extending along the yoke 10.

Figure 2:
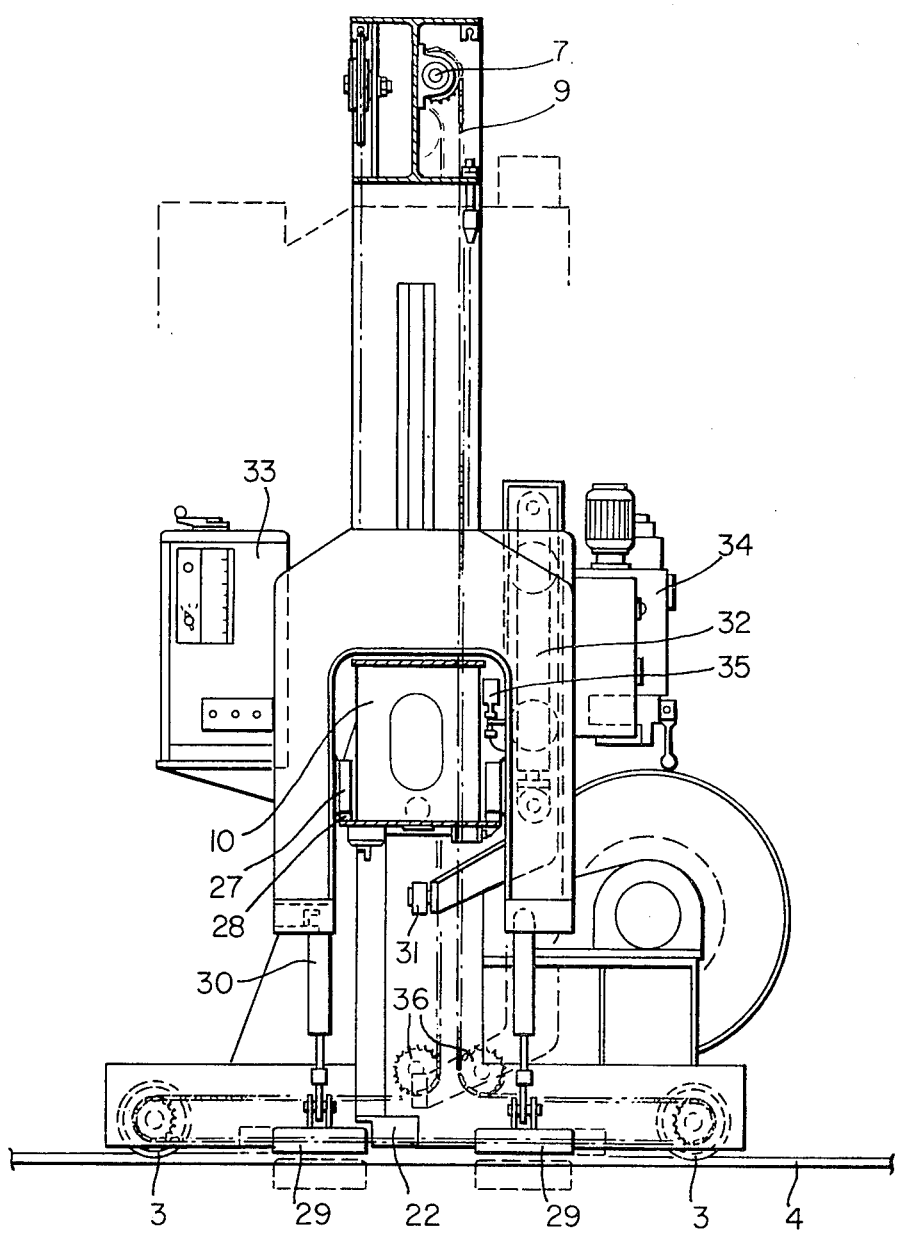
FIG. 2 is a section, to a somewhat enlarged scale, taken along the line II in FIG. 1.

FIG. 2 shows how the chain, which transmits motive power from the shaft 7 to the wheels 3, runs over two pulleys 36 which are disposed with provision for horizontal movement in the plane of the supporting upright and are therefore adapted to displace one supporting upright in relation to the other in the direction of movement of the gantry. This permits some adjustment of the parallelism of the sections.

FIG. 2 also shows how the yoke 10 is a box construction having an internal cavity which can be used as a duct for the suctional removal of smoke gases evolved during welding.

It will be clear to the skilled addressee that the invention can be varied in a number of ways within the scope of the following claims. For instance, the gripper magnets can be pivotably disposed on the magnet holders, so that the vertical postion of the section retainded by the gripper magnets can be adjusted without necessitating the rotation of the yoke in relation to the guide shoes. The yoke can also have a plurality of jigs if this should be desirable for reasons of capacity.

I claim:

1. An apparatus for the application, positioning and adjustment of sections in the assembly of panels or the like, comprising a horizontally movable gantry adapted to transfer the sections from a store to that place on the panel plate to which the individual sections are to be welded, the gantry comprising a vertically movable yoke extending substantially parallel with the girder of the gantry, and having a number of gripper magnets for the sections, characterized in that the yoke is attached to the supporting uprights of the gantry with provision for vertical adjustment, said yoke having a jig displaceable along the yoke and comprising lifting means for retaining the panel plate and jack means for pressing the section against the panel plate.

2. An apparatus according to claim 1, characterized in that the ends of the yoke are vertically displaceable independently of one another.

3. An apparatus according to claim 1, characterized in that the yoke has means for rotating the gripper magnets.

4. An apparatus according to claim 1 characterized in that the supporting uprights of the gantry are movable to a limited extent in relation to one another in the direction of movement of the gantry.

5. An apparatus according to claim 1 characterized in that the lifting means of the jig are pivotably attached to lifting devices.

6. An apparatus according to claim 1 characterized in that the jig comprises tack welding means.

7. An apparatus according to claim 1 characterized in that the yoke comprises lowerable sectional supporting legs.

8. An apparatus according to claim 1 characterized in that the jig has an energy supply.

9. An apparatus according to claim 1 characterized in that the yoke is formed with an inner cavity acting as a duct for the removal of gases.

10. An apparatus according to claim 1 characterized in that the yoke has means for its adjustment in its longitudinal direction.

11. An apparatus according to claim 10, characterized in that said adjustment means comprise hydraulic cylinders disposed in the longitudinal direction of the yoke at its ends and whose plunger rods are at their projecting ends pivotably borne in guide shoes movable vertically along the supporting uprights of the gantry.

* * * * *